(12) United States Patent
Kapur et al.

(10) Patent No.: US 8,323,577 B2
(45) Date of Patent: *Dec. 4, 2012

(54) LAYERED ADAPTIVE MEMBRANE STRUCTURE

(75) Inventors: Vivek Kapur, Kennett Square, PA (US);
Joseph D. Trentacosta, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1728 days.

This patent is subject to a terminal disclaimer.

(21) Appl. No.: 11/584,999

(22) Filed: Oct. 23, 2006

(65) Prior Publication Data
US 2012/0114883 A1 May 10, 2012

(51) Int. Cl.
*G01N 33/00* (2006.01)
(52) U.S. Cl. ......... 422/119; 422/50; 422/68.1; 422/117; 436/104; 2/272; 2/457; 251/129.01; 251/333; 428/137
(58) Field of Classification Search ............... 422/50, 422/68.1, 117, 119; 436/104; 2/272, 457; 251/129.01, 333; 428/137
See application file for complete search history.

(56) References Cited

U.S. PATENT DOCUMENTS

| | | | |
|---|---|---|---|
| 4,515,761 A | 5/1985 | Plotzker | |
| 6,395,383 B1 | 5/2002 | Maples | |
| 6,579,948 B1 | 6/2003 | Tan et al. | |
| 6,841,601 B2 | 1/2005 | Serpico | |
| 7,597,855 B2 * | 10/2009 | Trentacosta et al. | 422/119 |
| 7,625,624 B2 * | 12/2009 | Trentacosta et al. | 428/137 |
| 7,955,684 B2 * | 6/2011 | Trentacosta et al. | 428/137 |
| 7,993,606 B2 * | 8/2011 | Trentacosta et al. | 422/501 |
| 8,048,371 B1 * | 11/2011 | Kapur et al. | 422/50 |
| 2005/0249917 A1 | 11/2005 | Trentacosta et al. | |

* cited by examiner

*Primary Examiner* — Lyle Alexander

(57) ABSTRACT

A layered adaptive membrane structure that has movable membranes is provided. The structure can change its gas, liquid and/or particulate permeability in response to surrounding environmental conditions. Applications include protective apparel that is comfortable to wear wherein the level of protection provided is based on conditions in the environment. Hence, the protective apparel is highly breathable and comfortable in a non-hazardous environment but impermeable or only semipermeable in a hazardous environment.

14 Claims, 7 Drawing Sheets

LAYERED ADAPTIVE MEMBRANE STRUCTURE

TECHNICAL FIELD

The present invention relates to an adaptive membrane structure that has movable membranes.

BACKGROUND

There is a growing need for personal protective apparel that guards against toxic chemical and biological agents. These agents may be
  (a) accidentally released in a chemical manufacturing plant, in a scientific or medical laboratory or in a hospital;
  (b) released intentionally during wartime by a government to attack the military forces of the opposition; or
  (c) released during peacetime by criminal or terrorist organizations with the purpose of creating mayhem, fear and widespread destruction.

For this reason, the United States military and other defense organizations of countries all over the world have sought to provide adequate protection against chemical and biological warfare agents. The need for such protective apparel also extends to police departments, fire departments, emergency responders and health care providers. These organizations are responsible for providing assistance and relief after a catastrophic release of chemical or biological toxins, but they cannot discharge their responsibilities without adequate protection ("Chemical Protective Clothing for Law Enforcement Patrol Officers and Emergency Medical Services when Responding to Terrorism with Chemical Weapons", Arca, V. J. and Marshall, S. M., in report of the Chemical Weapons, Improved Response Program, U.S. Army Soldier and Biological Chemical Command, November 1999).

According to the *Handbook of Chemical and Biological Warfare Agents* (D. Hank Ellison, CRC Press, Boca Raton, Fla., 1st edition, 1999), most chemical warfare toxins are fatal at concentrations as low as 1 part per million (ppm). Hence, to provide adequate protection from chemical warfare agents, a protective suit has to be almost impermeable to such chemicals. It is not difficult to devise structures that are impermeable to toxic chemical vapors and liquids, but such structures are also hot, heavy and uncomfortable to wear. The degree of comfort offered by a protective suit is largely determined by the amount of water vapor that can permeate through the protective fabric. The human body continuously perspires water vapor as a method for controlling body temperature. When a protective fabric hinders the loss of water vapor from the body, the transpirational cooling process is hindered, which leads to personal discomfort. When a protective suit allows little or no loss of water vapor, extreme heat stress or heat stroke can result in a short period of time. Hence, in addition to offering the highest levels of protection against toxic chemicals and liquids, it is desirable that a practical chemical and biological protective suit have high water vapor transmission rates. Desirable protective structures are also light in weight and offer the same high level of protection over a long period of time.

Some currently available protective garments offer a constant level of protection at all times, but in most situations, protection is only needed when a toxic chemical or biological agent is present in the environment. Further, comfort is typically sacrificed at the expense of protection or vice versa. A garment is needed that provides a variable and controllable permeability.

U.S. application Ser. No. 11/118,961 discloses a structure having two membranes and means to respond to an actuating stimulus (for example, an electrostatic force) that will move one membrane into contact with the other such that the permeability of the structure to gas, vapor, liquid and/or particulates is decreased. However, a structure such as that disclosed may be subjected to use for the purpose of protecting against exposure to extremely toxic agents, such as those encountered in chemical and biological warfare.

It may thus be desirable in such situations to consider an alternative to disclosed structure. Such an alternative may incorporate additional barrier(s) to the transport of threatening agents that cooperate with the movable membranes of the adaptive membrane structure as described, and thereby limit the permeability of the structure to threatening agent(s), even in the event of an incomplete seal between the movable membranes. Furthermore, such hybridization of an adaptive membrane structure with additional barrier(s) when properly designed will result in enhanced performance of these additional barrier(s) in rejecting threatening agents relative to their performance without such hybridization.

SUMMARY

One embodiment of this invention is an adaptive membrane structure that includes first and second membranes, a third membrane interposed between the first and second membranes, and means to respond to an actuating stimulus that moves the first and second membranes into contact with the third membrane; wherein the permeability of the first and second membranes to gas, vapor, liquid and/or particulates is greater than that of the third membrane.

Another embodiment of this invention is an adaptive membrane structure that includes first and second membranes having holes, a third membrane interposed between the first and second membranes, and means to respond to an actuating stimulus that moves the first and second membranes into contact with the third membrane; wherein $$k_{LPM}t_{LPM} \leqq 10 k_{HPM1}t_{HPM1}$$

and $$k_{LPM}t_{LPM} \leqq 10 k_{HPM2}t_{HPM2}$$

wherein
  $k_{LPM}$ is the permeability of the material from which the third membrane is made,
  $k_{HPM1}$ is the permeability of the material from which the first membrane is made,
  $k_{HPM2}$ is the permeability of the material from which the second membrane is made,
  $t_{LPM}$ is the thickness of the third membrane,
  $t_{HPM1}$ is the thickness of the first membrane, and
  $t_{HPM2}$ is the thickness of the second membrane.

A further embodiment of this invention is an adaptive membrane structure that includes first and second membranes having holes, a third membrane that is substantially free of holes interposed between the first and second membranes, and means to respond to an actuating stimulus that moves at least a portion of each of the first and second membranes into contact with the third membrane.

Yet another embodiment of this invention is an adaptive membrane structure that includes first and second membranes having holes, a third membrane interposed between the first and second membranes, and means to respond to an actuating stimulus that moves at least a portion of each of the first and second membranes into contact with the third membrane in a position in which the holes of the first membrane, or portion thereof, are substantially out of registration with the holes of the second membrane, or portion thereof.

Other objects and advantageous technical effects offered by this invention are more fully described below.

DETAILED DESCRIPTION

Figure 1A:
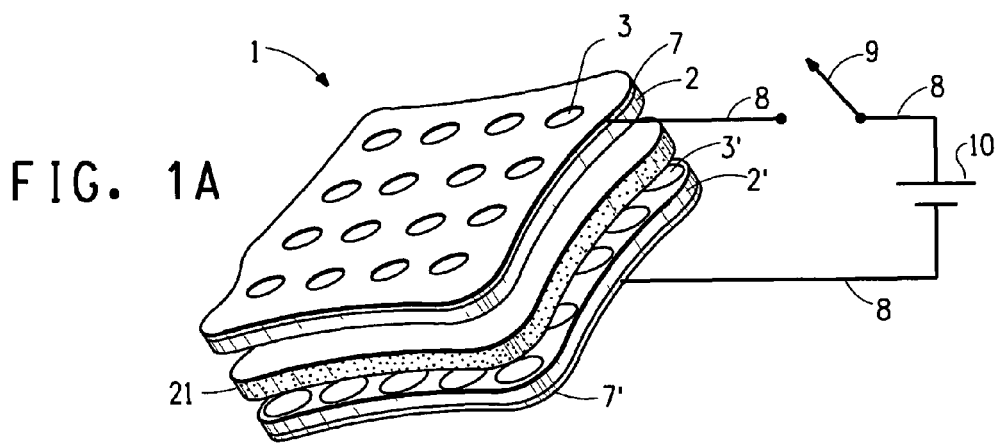
FIG. 1 is a schematic diagram of an unactuated adaptive membrane structure: (1A: perspective view, 1B: plan view, 1C: sectional view).

The adaptive membrane structure disclosed herein overcomes some limitations of protective garments and other protective structure. An "adaptive membrane structure" is a structure comprising at least two membranes wherein the membranes are movable upon the activation or application of an actuating stimulus such as a force. The membrane structure is thus "adaptive" in the sense that the permeability of the structure can be changed based on the conditions in the external environment. In this invention, a third membrane is interposed between the two movable membranes to enhance the ability to control the permeability of the membrane structure. Permeability as used herein is defined as the mass transported per unit area of a membrane or membrane structure, per unit time per unit driving force where the driving force is the difference in concentration of the species of interest on the opposite sides of the membrane or membrane structure.

A "membrane" as used herein is a discrete, thin article that moderates the transport of species in contact with it, such as gas, vapor, aerosol, liquid and/or particulates. Examples of membranes include without limitation film, plastic sheeting, synthetic barriers, layers, laminar structures, woven fabric, and nonwoven sheet. A membrane may be chemically or physically homogeneous or heterogeneous. A "microporous membrane" is a membrane typically containing pores in the range of 0.1 to 10 micrometers in diameter. Microporous membranes are typically characterized by the fraction of total membrane volume that is porous (i.e. relating to porosity), a term reflecting the average pore length within the membrane compared with membrane thickness (i.e. relating to tortuosity), and average pore diameter. The term "pore" as used herein denotes an opening that exists in a membrane that may or may not completely traverse the membrane. Typically, the pore size, the pore shape and/or the pore placement in a membrane is not well defined or controlled, although there may be a relatively reproducible average pore size and/or pore size distribution.

The movable membranes used in the structures disclosed herein typically have holes as distinguished from pores, a "hole" being an opening that completely traverses a membrane. In FIGS. 1C and 2C, membrane 2 has holes 3 and membrane 2' has holes 3'. The holes of one membrane may or may not be the same size and shape as the holes of another membrane. Although holes may be described herein as having the shape of a circle, it is not required that a hole have a shape that is perfectly or even approximately circular.

The holes of one membrane may be aligned with the holes of another membrane, in the sense of lines perpendicular or substantially perpendicular to the respective planes of the membranes in the side elevation view of the structure, such that the holes overlap completely, partially or not at all. Holes overlap completely when, if they are the same size, their boundaries are coincident in vertical alignment, or if they are not the same size, the area of the smaller hole fits entirely within the area of the larger hole. Holes do not overlap at all when, again in the sense of vertical alignment, a line perpendicular or essentially perpendicular to the respective planes of the membranes from its point of exit from a hole in one membrane does not enter into any part of a hole on the other membrane. Membranes with holes that have no overlap are shown in FIGS. 1C and 2C. A line, for example, that is perpendicular or essentially perpendicular to the respective planes of membranes 2 and 2' and that exits from any of holes 3 would not enter into any hole 3'. Partial overlap is the intermediate condition when the perpendicular or essentially perpendicular line exiting from a hole on one membrane will enter into only a portion of a hole on the other membrane.

In the description in the preceding paragraph, a line that is perpendicular or essentially perpendicular to the plane of a membrane will pass all the way through a hole in such membrane only if the hole is essentially a right circular cylindrical hole. The above description concerning overlap of holes is nevertheless accurate for membranes that have holes in which the axis of the hole is not normal to the plane of the membrane or is tortuous because the portion of a line passing through such hole that is relevant to the determination of overlap of holes is the portion of the line from its exit point from a hole on one membrane to the point of its entry, if any, into a hole on another membrane. That portion of the line may be described as perpendicular or essentially perpendicular to the plane of one or both membranes regardless of the route it has taken in passing through any of the holes.

The term "open area" is used to refer to the extent, expressed as a percentage, to which the respective holes of two membranes overlap, as most easily envisioned in terms of a plan view of the structure from the top. For membranes in which the holes do not overlap at all, such as those of FIGS. 1C and 2C, the open area is defined as 0%. Conversely, an open area of 100% corresponds to the existence of the maximum open area, which is achievable by arranging a particular set of membranes such that the holes completely overlap. A percentage between 0 and 100 indicates partial overlap. The terms "not in registration" and, equivalently, "out of registration" are used herein to indicate that the holes in two membranes do not overlap at all (referring again, for example, to FIGS. 1C and 2C); this is equivalent to having an open area of 0%. The term "substantially out of registration" indicates that there is partial overlap, i.e. that the open area of the membrane structure is in the range of from greater than 0% up to, but not including, 50%. In FIGS. 1C and 2C, for example, holes 3 are out of registration with holes 3'.

The degree of registration of the holes of two membranes may be described as set forth above even when, as in the case of the membrane structure disclosed herein, a third membrane is interposed between the two membranes for which the degree of registration of holes is of interest. The presence of the third membrane between the two membranes having holes does not affect the position of the holes, and the vertical alignment of the holes with respect to each other may be described with equal accuracy in terms of lines perpendicular or essentially perpendicular to the respective planes of the membranes having holes despite the fact that such lines would pass through a third membrane interposed between the two membranes having holes.

The adaptive membrane structure may be "actuated", which denotes the state of the structure upon the application or operation of a stimulus, such as a force (the "actuating stimulus"), which causes surfaces of adjacent membranes to move into contact with each other, thereby changing the permeability of the membrane structure. Adjacent membranes are membranes that may be brought into contact with each other. The term "unactuated" thus denotes the state of the adaptive membrane structure before application of the actuating stimulus, in which state a gap exists between the membranes that will be brought into contact upon application of the actuating stimulus. The term "deactuated" denotes the state of the adaptive membrane structure after the application and subsequent removal of the actuating stimulus when accompanied by re-formation of the gap between adjacent membranes that had been in contact when actuated.

The term "adaptive barrier system" as used herein denotes a system comprising an adaptive membrane structure in which actuation changes the permeability of the membrane structure to chemical, biological and/or particulate species.

Thus, the adaptive membrane structure is capable of displaying a variety of states of gas, vapor, liquid and/or particulate permeability. For example, when the membrane structure is used for protection against hazardous agents, it can display two different states of permeability. In one state, when hazardous environmental conditions do not exist, the membrane structure is highly permeable to water vapor and gases, thereby offering a high level of personal comfort. The term "unactuated" is used herein to denote this state. When the membrane structure is exposed to a hazardous environment, it is transformed to another state, in which it is impermeable to hazardous chemical and/or biological toxins and/or pathogens, thereby offering a high level of protection when it is needed. In the actuated state, the structure may, however, remain permeable to water vapor.

The conversion of the membrane from one state of permeability to another state of permeability is brought about by the application of a stimulus, such as a force, herein termed an "actuating stimulus". The actuating stimulus can be any of several forms including without limitation pressure, force, change in temperature or ambient concentration of water vapor, voltage, current, magnetic field, and electric field. In one embodiment of this invention, the actuating stimulus takes the form of an applied electric field, which causes membranes within the structure to move to convert the structure from an unactuated to an actuated state.

The application of the actuating stimulus could be effected with a manually operated switch. In an alternative embodiment, however, a sensor could detect a change in the environment in which the structure is located, and could automatically activate the actuating stimulus. The sensor can do this by responding, for example, to a change in temperature or humidity or to the presence (as indicated by change of concentration) of an undesirable chemical, biological and/or particulate species by sending a signal (for example, an electrical, optical or radio wave signal) to close a circuit to activate, i.e. trigger the application of, the actuating stimulus.

In the adaptive membrane structure a low permeability membrane ("LPM") is interposed between two high permeability membranes ("HPM") where the term permeability refers to the extent of transport of a particular chemical or biological species, or set of species, for which the adaptive membrane structure is designed to substantially inhibit transport. Both the LPM and HPM membranes may have different permeabilities with respect to species other than those for which the structure is designed to substantially inhibit transport. For example, in some applications, it is desirable for both the LPM and HPM membranes to have high permeability to water vapor in both the actuated and unactuated states.

A HPM has high permeability because it contains holes, and the permeability of a membrane is distinguished from the inherent permeability of the material from which the membrane is made. A HPM is made from a low permeability material because, once the membrane is fabricated by placing holes in the material, the permeability of the membrane is overwhelmingly determined by the presence of the holes. It is generally not desired to make a HPM from a high permeability material because then the permeability of the membrane would be determined by the competing transport of material through both the holes and the material from which the membrane is made in areas where there are no holes. It is desired that the permeability of a RPM be determined to an insignificant extent, if to any extent at all, by the inherent permeability of the material from which the membrane is made, but rather be determined, as stated above, predominantly, if not completely, by the presence of holes in the material from which the HPM is made.

A LPM by contrast is substantially free of holes, and its permeability is thus determined by the inherent permeability of the material from which the LPM is made. The condition of a membrane being substantially free of holes includes the condition of being actually free of holes, and also includes the condition of having such number of holes that the permeability of the membrane is not more than about 5 percent greater, preferably not more than about 2 percent greater, and more preferably not more than about 0.5 percent greater, than the inherent permeability of the material from which the membrane is made.

Permeability may be determined by various methods including, without limitation, those described in ASTM F739-91, "Standard Test Method for Resistance of Protective Clothing Materials to Permeation by Liquids or Gases Under Conditions of Continuous Contact".

In the unactuated state of the structure, gaps exist between the HPMs and either side of the LPM. In this unactuated state, the net permeability of the adaptive membrane structure is lower than the permeability of a similar membrane structure in which only the HPMs are present and the interposed LPM is absent. The permeability of the adaptive membrane structure may be modulated over a broad range by selection of the permeability and thickness of the LPM in terms of the particular species that are expected to contact the membrane structure. These are the species as to which the user of the structure desires to control the transport through the structure. In general, it is preferred that the ratio of permeability of the material from which the LPM is made ("kLPM") to the LPM thickness ("tLPM") be substantially larger than this same ratio (i.e., kHPM1/tHPM1 or kHPM2/tHPM2) for the first and second HPMs.

More preferably, $$k_{LPM}/t_{LPM} \geqq 10 k_{HPM1}/t_{HPM1}$$

and $$k_{LPM}/t_{LPM} \geqq 10 k_{HPM2}/t_{HPM2}$$

wherein
- $k_{LPM}$ is the permeability of the material from which the third membrane is made,
- $k_{HPM1}$ is the permeability of the material from which the first membrane is made,
- $k_{HPM2}$ is the permeability of the material from which the second membrane is made,
- $t_{LPM}$ is the thickness of the third membrane,
- $t_{HPM1}$ is the thickness of the first membrane, and
- $t_{HPM2}$ is the thickness of the second membrane.

Upon actuation of the adaptive membrane structure, the HPMs are brought in contact with the adjacent surfaces of the LPM, thereby eliminating the gaps previously maintained between these membranes. In the actuated configuration, the transport rate through the structure is thus greatly reduced since the holes in the HPMs are out of registration, and species must now largely diffuse into and then within the plane of the LPM if they are to be able to successfully pass through the structure. Most importantly, the presence of the LPM as an additional barrier to transport through the structure over that provided by the HPMs alone substantially increases the probability that, in the actuated state, no leakage of undesired agents through the structure would occur as compared to the situation in which there was a failure to obtain a seal of high perfection directly between the HPMs themselves.

The adaptive membrane structure is thus capable of displaying at least two states of vapor and or liquid permeability. For example, when the membrane structure is used as a garment for personal protection against hazardous agents, it can in one state, when hazardous environmental conditions do not exist, be highly permeable to water vapor and gases, thereby offering a high level of personal comfort. The structure in such case would be in its "unactuated" state. When the garment is exposed to a hazardous environment, however, it is transformed to another state in which it is impermeable to hazardous chemical and biological toxins, thereby offering a high level of personal protection when it is needed. The conversion of the membrane from one state of permeability to another state of permeability is brought about by the application of an "actuating stimulus" as described above.

Figure 1B:
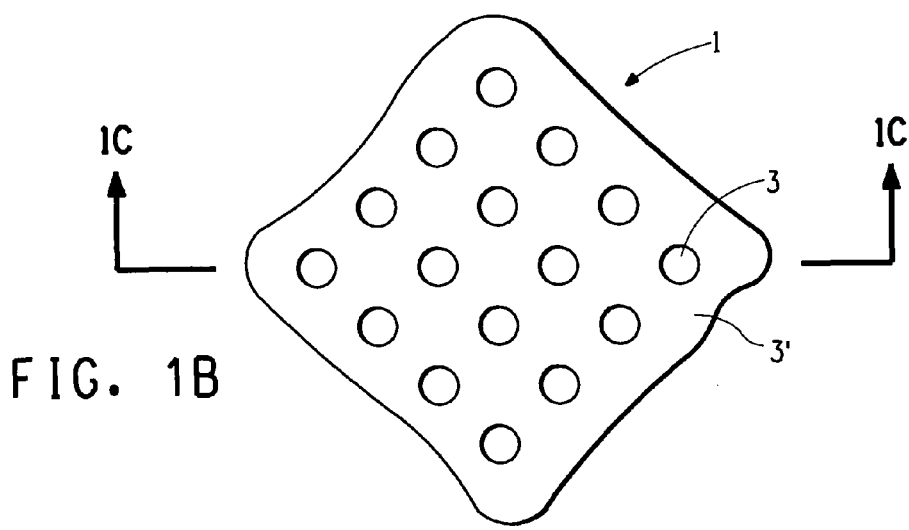
Figure 1C:
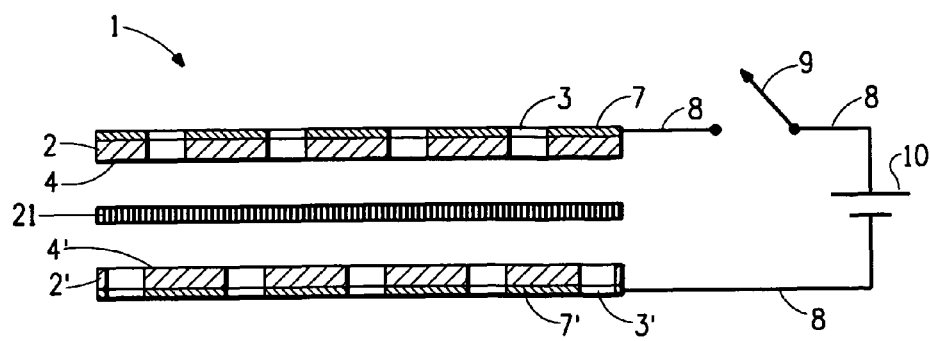
Figure 2A:
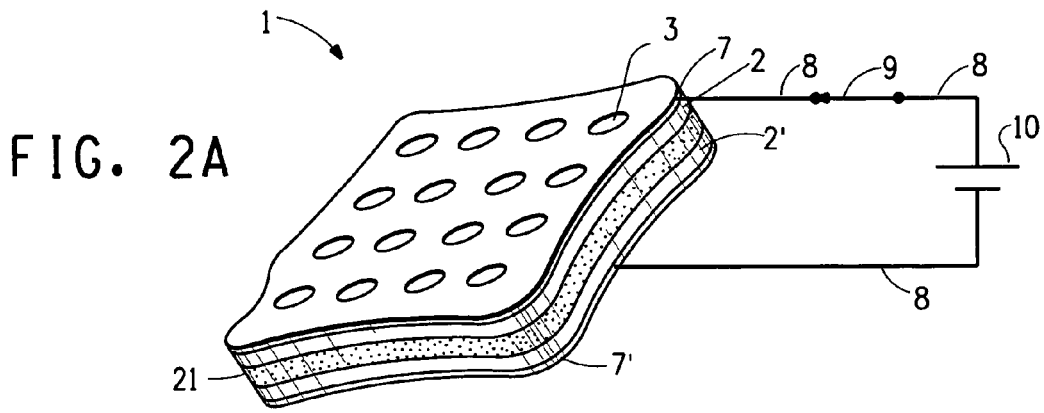
FIG. 2 is a schematic diagram of an adaptive membrane structure in its actuated state: (2A: perspective view, 2B: plan view, 2C: sectional view).
Figure 2B:
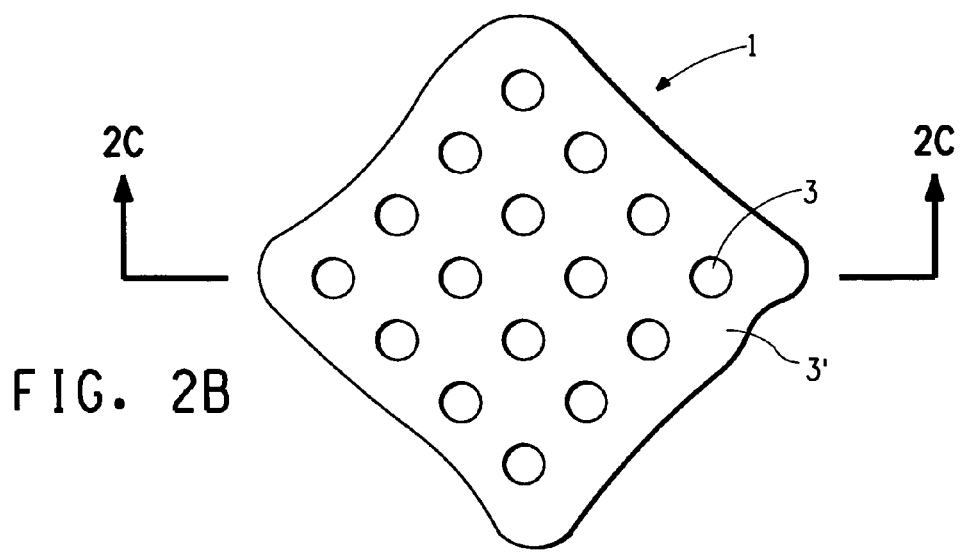
Figure 2C:
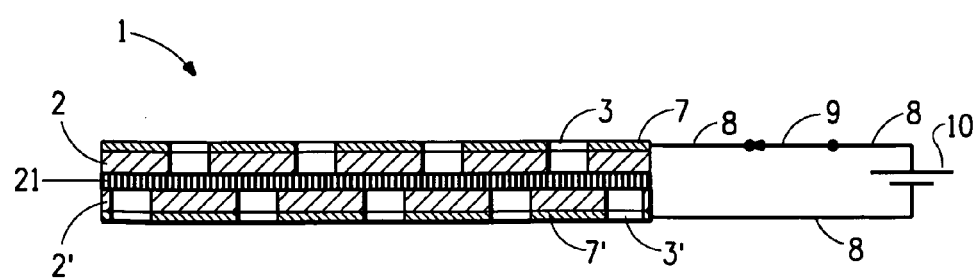

A schematic of a typical embodiment of an adaptive barrier system according to this invention is shown in FIGS. 1A, 1B, and 1C. In this embodiment, HPMs 2 and 2' comprise arrays of holes configured such that, as would be most readily apparent in terms of contact between the two HPMs along their surfaces 4 and 4', the holes are at least substantially out of registration with each other. The holes completely traverse the thickness of the HPMs, giving rise to a path of increased convection and/or diffusion of a chemical, biological and/or particulate species across and through the membrane thickness when compared to convection and/or diffusion of the same species through the material of the HPM surrounding the hole. A LPM 21, which is substantially free of holes, is interposed between the HPMs 2 and 2' such that upon electrostatic actuation by closure of switch 9, as more fully described below, the membrane surfaces 4 and 4' contact, respectively, the two adjacent surfaces of LPM 21 as shown in FIGS. 2A, 2B, and 2C.

As mentioned above, the array of holes in each HPM is such that the openings of the array of holes on the membrane surfaces 4 and 4', despite the presence of the interposed LPM, may be said to be at least substantially out of registration with each other. That is, the alignment of the holes in the structure provides a degree of hole overlap such that the open area is less than 50%. It is preferred that the open area be 10% or less, more preferred that it be 1% or less, and it is most preferred that the holes be out of registration, and that the open area be 0%. It is not required that the HPMs contact each other for the degree of hole overlap to be a relevant and accurate descriptive feature of the structure because degree of hole overlap will, as more fully described below, determine the nature of the pathway through the structure when the structure is in the actuated state. Although most easily envisioned in terms of direct contact of the HPMs, degree of hole overlap is nevertheless a characteristic that has equal applicability to the structures disclosed herein, because the effectiveness of the seal in the actuated state is determined by both the degree of overlap and the permeability and thickness of the material from which the LPM is made.

Figure 4:
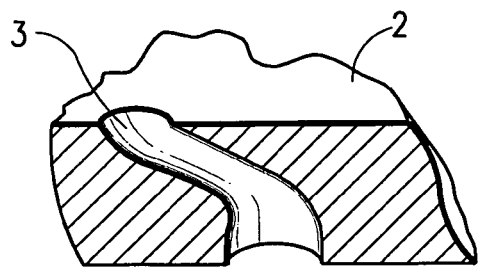
FIG. 4 is a schematic diagram of a section view of a membrane with a hole of non-circular cross-section.

Although the holes depicted in FIGS. 1A, 1B, 1C, 2A, 2B, and 2C are right circular cylindrical holes with linear axes normal to the plane of the membranes, the holes in the membranes disclosed herein are not limited to this geometry. In particular, each hole may have other non-circular cross-sectional shapes and/or inclinations of their axes relative to the plane of the membrane. Indeed, generally any hole need not traverse the membrane along a linear path but may instead follow a non-linear, tortuous path. Furthermore, the cross-sectional shape of any hole need not be constant as the hole traverses the membrane. FIG. 4 shows a section view of part of a membrane according to the invention with a hole with non-circular cross-section, which changes in shape and size as it traverses the membrane along a generally tortuous path. The optimum hole diameter will vary depending on the specific use to be made of the membrane structure, particularly how much flow or diffusion is desired through holes in the unactuated state, as well as the permeability of the interposing LPM.

Although the hole arrays depicted in FIGS. 1A, 1B, 1C, 2A, 2B, and 2C are based on the same regular square pitch pattern, the hole array in a membrane as used in this invention is not limited to this pattern. In particular, the array pattern on HPM 2 may be different from the pattern on HPM 2', and either pattern may comprise any regular or non-regular pitch pattern provided that the patterns are such that the holes on the surface 4 of HPM 2 are substantially out of registration with the opening of any hole on the surface 4' of HPM 2'.

Again referring to FIGS. 1A, 1B, 1C, 2A, 2B, and 2C, the first and second membranes 2 and 2' may be fabricated from the same or different materials or combinations of materials and, furthermore, each membrane of the pair may have the same or different thickness.

The materials that may be used to create the HPMs 2 and 2', and the LPM 21, can be chosen from any sheet structure, but it is preferred that the sheet structure be flexible, and it is also preferred, although not necessary, that the materials used are polymeric in nature. Preferably, the flexible sheet structure can be prepared from at least one polymer component. The polymer sheets or films used to create HPMs 2 and 2', and the LPM 21, may be continuous (i.e. containing no microvoids or micropores), and the polymer sheets or films used to create any of the membranes may be microporous. Methods for creating continuous polymer sheets or films are known in the art, and they can be prepared from a large variety of polymers.

Polymers that may be used for creating sheets or films include, but are not limited to, polyesters, polyolefins (especially high-performance polyethylene), polyamides (aliphatic, aromatic, and mixed aliphatic/aromatic), polybenzazoles, polyimides, polyacrylonitrile, polysulfones, polycarbonates, homopolymer and copolymers of tetrafluoroethylene, homopolymer and copolymers of vinylidene difluoride, copolymers of butadiene and styrene, copolymers of ethylene and vinyl acetate, copolymers of ethylene and vinyl alcohol, copolymers of ethylene and acrylic monomers such as methacrylic acid and acrylic acid, and ionomers. Suitable ionomers include without limitation those formed by neutralizing copolymers of ethylene acid copolymers, perfluorinated sulfonate and carboxylate ionomers, and sulfonated polystryrene.

Polymer films and sheets produced from thermoplastic and vulcanized elastomers including without limitation polyurethanes, block copolymers and random copolymers of styrene and butadiene, block copolymers and random copolymers of styrene and isoprene, homopolymers of butadiene and isoprene, copolymers of ethylene and propylene, fluoroelastomers, natural rubbers, nitrile rubbers, polyacrylate rubbers, butyl rubbers and silicone rubbers are also useful in this invention. Continuous polymer films to be used to create membrane 2, 21 and 2' may also be semipermeable in nature. Semipermeable polymer membranes and their manufacture are known in the art from sources such as U.S. Pat. Nos. 4,515,761, 6,395,383, 6,579,948 and 6,841,601.

The starting materials to create the membranes used in the present invention are not limited to continuous polymer films. Suitable starting materials may also have microvoids or micropores such as those present in microporous membranes, in which the typical pore size is about 0.1 to 10 micrometers. Various methods for creating microporous membranes include the track-etch process used for creating Nuclepore® brand polyester and polycarbonate membranes (Whatman Inc., Clifton, N.J.);

phase inversion processes for creating polysulfone, aromatic polyamide, and polyvinylidene fluoride membranes;

stretching processes for creating microporous polytetrafluoroethylene and polyethylene membranes;

phase separation processes in which a nonreactive species ("porogen") present during a polymerization reaction is subsequently extracted from the polymer product; and spun bonded/melt blown processes for creating nonwoven sheet structures.

Of particular utility in this invention is the incorporation of a LPM that is largely impermeable to toxic agent(s) but relatively permeable to moisture. Suitable materials from which such a LPM may be made include without limitation a highly fluorinated ion exchange polymer containing sulfonic acid metal ion salt functional groups (as described, for example, in U.S. Pat. No. 4,515,761); polyethyleneimine based permselective membranes (as described, for example, in U.S. Pat. No. 6,395,383); semipermeable membranes made from block copolymers of polystyrene and isobutylene, where a fraction of the styrene segments have been sulfonated to form sulfonic acid groups (as described, for example, in U.S. Pat. No. 6,579,948); and self assembled polyelectrolyte films such as those formed from sulfonated styrene/ethylene-butylene/styrene (S-SEBS) triblock copolymers (as described, for example, in U.S. Pat. No. 6,841,601).

This invention is further defined by the relative permeability of the HPMs 2 and 2' as compared to the permeability of the LPM 21 with respect to a particular gaseous or liquid agent for which a change in transport across the structure in the actuated vs. the unactuated states is desired. In particular, it is preferred that the ratio $k_2/t_2$ computed by dividing the permeability of the material from which the HPM 2 is made (denoted $k_2$) by the thickness of HPM 2 (denoted $t_2$) and, likewise, the ratio $k_{2'}/t_{2'}$ computed by dividing the permeability of the material from which the HPM 2' is made (denoted $k_{2'}$) by the thickness of membrane 2' (denoted $t_{2'}$) be less than about 10 percent of the ratio $k_{21}/t_{21}$ computed by dividing the permeability of the material from which the LPM 21 is made (denoted $k_{21}$) by the thickness of membrane 21 (denoted $t_{21}$). In a more preferred embodiment, the ratios $k_2/t_2$ and $k_{2'}/t_{2'}$ are less than about 1.0 percent of the ratio $k_{21}/k_{21}$. In a most preferred embodiment, the ratios $k_2/t_2$ and $k_{2'}/t_{2'}$ are less than about 0.1 percent of the ratio $k_{21}/t_{21}$.

Figure 3A:
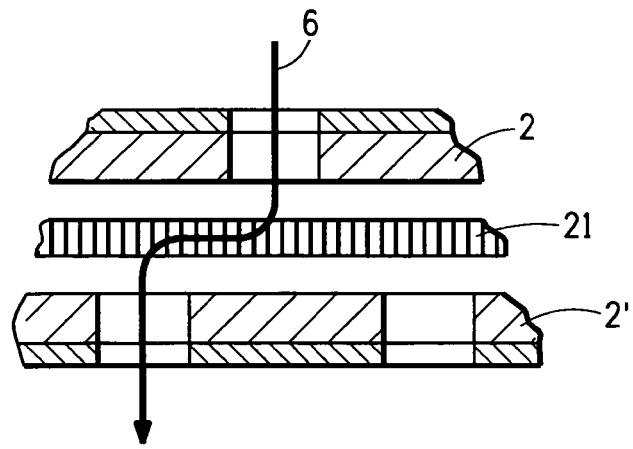
FIG. 3 is a schematic diagram showing a representative path for transport of an agent of interest through a representative section of an adaptive barrier system in the unactuated (3A) and actuated (3B) states respectively.
Figure 3B:
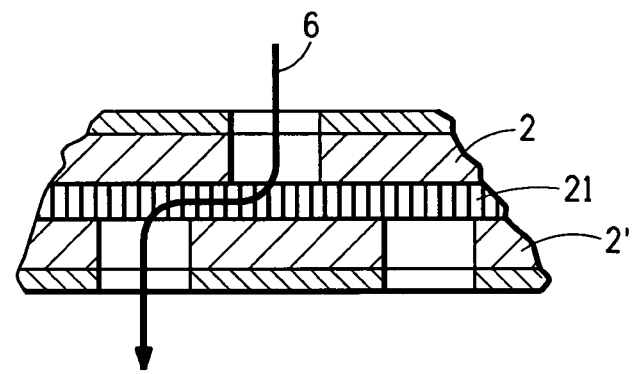

FIGS. 3A and 3B show schematically a representative path 6 for transport of an agent of interest through a representative section of the adaptive membrane structure in the unactuated and actuated states, respectively. In the unactuated state shown in FIG. 3A, the agent passes preferentially through the holes in HPM 2 and then diffuses through the LPM 21 in a direction that is essentially normal to the surfaces of the largely planar LPM. The agent then passes preferentially through the holes in HPM 2'. As the HPMs are made from low permeability material, having ratios of permeability to thickness as described below, diffusion of the agent through the HPMs 2 and 2' at regions away from the holes is negligible. In the actuated state shown in FIG. 3B, the agent preferentially enters the LPM 21 from within the perimeter of the holes included in HPM 2, then diffuses through LPM 21 in a direction that is essentially parallel to the surfaces of the largely planar LPM, and then leaves the system within the perimeter of the holes incorporated in HPM 2'. Therefore, the length of the path for diffusion for the agent of interest through LPM 21 is, in general, different in the actuated state than in the unactuated state. In particular, as described below, the geometric parameters of the adaptive membrane structure may be chosen to make the diffusion path significantly longer in the actuated state than in the unactuated state thereby greatly reducing the mass flux of the agent of interest in the actuated state vs. the unactuated state.

The mass flux of the agent of interest through the adaptive membrane structure in the unactuated state is to a first approximation given by $$w_{unactuated} = A\left(\frac{k_{21} l^2}{t_{21}}\right)$$

where A denotes a constant of order one over the agent concentration gradient across the structure, and l denotes the spacing between holes in the HPMs 2 and 2'. Furthermore, the mass flux for the agent of interest through the structure in the actuated state is to the same order of approximation given by $$w_{actuated} = B\left(\frac{k_{21} D t_{21}}{l}\right)$$

where B denotes a constant of order one over the agent concentration gradient across the structure, and D denotes the diameter of the holes in HPMs 2 and 2'. As such, the ratio of mass transport in the actuated to unactuated state is to the same order of approximation given by $$\frac{w_{actuated}}{w_{unactuated}} = C\left(\frac{Dt_{21}^2}{l^3}\right)$$

where C is a constant of order one. Although, in this analysis, D and l are taken to be the equal for the HPMs 2 and 2', this is done without loss of generality, assuming each is of the same order of magnitude for the two membranes.

Any of the membranes may also contain materials to adsorb, absorb, or react with harmful and undesired species. Hence, the membrane may include activated carbon, high surface silica, molecular sieves, xerogels, ion exchange materials, powdered metal oxides, powdered metal hydroxides, antimicrobial agents, and the like, which may be in the form of nanoparticles if so desired. Such materials would typically be mixed into the membrane material during the membrane formation process, such as, but not limited to, extrusion compounding or solution casting.

Holes in the HPMs may be formed by any hole manufacturing process known in the art. Mechanical processes that may be used for creating holes in sheets and films include without limitation drilling, punching, piercing, boring, and perforating. Holes may also be created by other means such as ultrasonic waves, electrical discharge, high energy radiation such as lasers and electron beams, and high velocity water jets. Various etching techniques, whereby material is removed by chemical means, may also be used to create holes in membranes. A preferred hole manufacturing process for this invention is one in which material occupying the space where the hole is to be created is removed with the least amount of distortion to the material surrounding the hole. Methods for hole manufacturing that are especially preferred are mechanical punching and laser or electron beam drilling. Once the holes have been created, the membranes may be further processed to reduce any surface distortion that may have resulted due to hole formation process. Processes that may be used for such purpose include, without limitation, calendaring, pressing and planishing.

A preferred actuating stimulus for use in this invention is the force produced by electrostatics. The preferred electrostatic force may be applied to the structure by incorporating electrically conducting materials in or onto specific regions of at least two and possibly more membranes such that upon action of appropriate circuitry, the conducting regions on at least two membranes become oppositely charged, thereby creating an attractive force which brings two adjacent membranes into contact. In one embodiment, therefore, means to respond to an actuating stimulus may include such electrically conducting materials, and the features, lines and patterns into which they may be formed, on which an electrostatic force may operate.

FIGS. 1A, 1B, 1C, 2A, 2B and 2C show schematically a particular embodiment of a pair of HPMs 2 and 2' configured for an electrostatic actuating force. In this case, the surface of each membrane that is not adjacent to LPM 21 is coated with a conducting layer 7 and 7'. A potential source 10, switch 9, and conductor 8 are provided to permit electrostatic actuation of the structure.

Suitable metallic conductive coatings include without limitation silver, aluminum, copper, nickel, palladium, platinum, gold and alloys of these metals. An electrically conductive coating may also be prepared by dispersing colloidal forms of the aforementioned or other conductive metals into various polymers. Electrically conductive layers or electrodes may also be prepared from carbon blacks, graphite, carbon nanotubes and dispersion of such forms of carbon into polymers. Yet additional forms of conductive layers, such as those formed from indium tin oxide, may also be used. Conductive layers or electrodes may also be prepared from polymers that are inherently electrically conducting such as polyacetylene, polyaniline, polythiophenes, polypyrrole, poly(p-phenylene), poly(p-phenylene vinylene), or such conductive polymers that have been chemically modified, for example, with dopants to increase conductivity.

The conducting layers 7 and 7' may comprise the same or different materials and thickness. As depicted in FIGS. 1A and 1C, the two coated layers on HPMs 2 and 2' are further connected in series with each other through conductors 8 to a switch 9 and a source of electrical potential 10 which may include a battery or other power source such as a solar panel or fuel cell. As shown in FIGS. 1A and 1C, when the switch is open, there is no electromotive force and thus no actuating stimulus, but, as shown in FIGS. 2A and 2C, when the switch is closed, an attractive electrostatic force develops between the HPMs and thereby brings them into contact with LPM 21 along their respective adjacent surfaces.

Additionally, the conductive layers 7 and 7' may be coated with one or more dielectric layers that can impart additional features to the membrane structure. In particular, these layers may serve to insulate the conductive layers from the environment, thereby eliminating or minimizing the potential for undesirable shorting or arcing of the charged conductive layer to surrounding conductive objects. The dielectric layers may comprise the same or different thickness as compared to the conductive layers. Furthermore, in general, the dielectric coatings may be the same material or a different material than that from which the HPMs 2 and 2' are made. Note further that the membrane structure incorporating the dielectric coating may be oriented such that either the HPMs 2 and 2' or the added dielectric coatings face the LPM 21.

An added function of the dielectric layer may be to enhance the seal formed when the HPMs contact the LPM under action of the actuating stimulus. In particular, a coating comprising a compliant dielectric material such as an elastomer is especially suited to provide a compliant surface to enhance sealing of the membranes' surfaces in contact under action of the actuating stimulus. Such elastomers include without limitation polyurethanes, polyurethane-ureas, thermoplastic and vulcanized forms of styrene/butadiene and styrene/isoprene rubbers, natural rubber, silicone rubbers, butadiene rubbers, ethylene/propylene rubbers, acrylic rubbers and fluoroelastomers. It is preferred that the holes fully penetrate the HPMs 2 and 2', the conductive layers and the dielectric layers. It is also apparent that the permeability of the dielectric layer can influence the overall permeability of the membrane structure to the passage of the chemical, biological or other particulate species for which the system is designed.

Yet another function of the dielectric layer can be to adsorb, absorb or react with harmful and undesired species that may diffuse into the membrane structure when the membrane is in the unactuated state. Hence, the dielectric layer may include activated carbon, high surface silica, molecular sieves, xerogels, ion exchange materials, powdered metal oxides, powdered metal hydroxides, antimicrobial agents, and the like, which may be in the form of nanoparticles if so desired.

Figure 5:
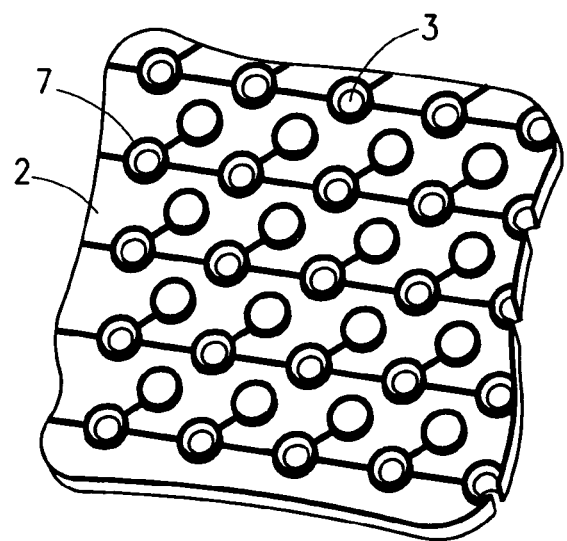
FIG. 5 is a schematic diagram of a membrane in which a conductive layer is applied to the membrane in an annular pattern around each hole.

Alternatively, the conducting layers need not cover the entire surface of each HPM but instead may be selectively applied in a pattern that only partially covers the membrane surface. One such example is shown in FIG. 5, in which a conductive layer 7 is applied to HPM 2 in an annular pattern around each hole 3. In this embodiment, all the annuli are connected to each other using electrically conducting lines applied to the HPM 2, and all the annular patterns are electrically connected to each other in series so that all annuli can be held at the same electrical potential by appropriate connection to a voltage source at some point in the network of lines and annuli.

Figure 6:
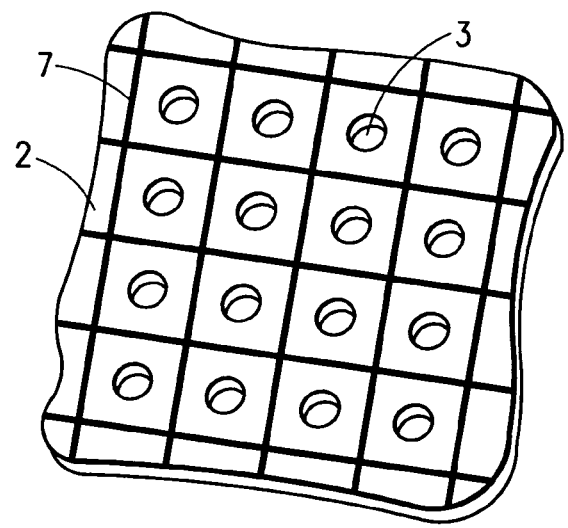
FIG. 6 is a schematic diagram of a membrane in which a conductive layer is applied to the membrane in parallel lines.

Another possible patterned electrode is shown in FIG. 6, in which the conducting layer 7 comprises two arrays of parallel electrically conducting lines applied to the HPM 2 traversing the space between the holes. In the pattern shown in FIG. 6, it is seen that any line from either array intersects, and is perpendicular to, the lines in the other array. Again, all points in this network of lines may be held at a single electrical potential by appropriate connection to a voltage source. The use of a patterned conducting layer as shown in FIGS. 5 and 6, as opposed to a continuous electrode as shown in FIG. 1, can increase the desirable permeability of the structure in the actuated state to species such as water vapor, since the barrier afforded by the electrode material to transport of these desirable species is removed over much of the substrate membrane surface. The geometric patterns that can be used to provide electrodes in this invention are not limited to those describe above.

The method for laying down conductive features, lines and patterns onto surfaces is known in the electronic manufacturing art. Some of the processes that may be used for creating conductive features include without limitation letterpress printing, screen printing, gravure printing, offset lithography, flexography, electrophotography, laser jet printing, and other variations of lithographic printing for laying down micron and submicron conductive features onto surfaces.

Figure 7:
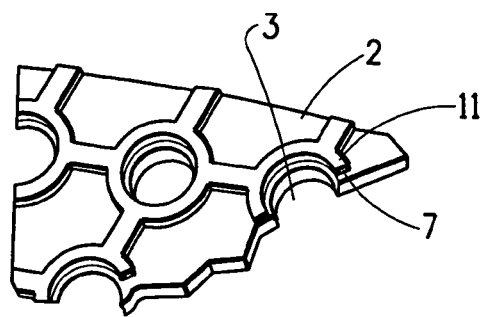
FIG. 7 is a schematic diagram of a portion of a membrane in which a patterned dielectric layer is applied to a patterned electrode layer applied to the membrane.

Dielectric layers, if they are incorporated in the structure as described above, also need not cover the entire surface of the substrate membrane. In particular, if a patterned electrode is used in a structure of this invention, a patterned dielectric layer may be used that covers the patterned electrodes to electrically isolate them from their surroundings, but the dielectric layer need not cover all of the remaining substrate surface that is not covered by the patterned electrode layer. FIG. 7 shows an example of a patterned dielectric layer 11 applied to a patterned electrode layer 7 that is in turn applied to a substrate membrane 2 in a similar design. It will be noted that the patterned dielectric in this example covers an area slightly larger than the patterned electrode to insure isolation of the electrode. Note further that the patterned dielectric layer, in addition to providing electrical isolation, may also have functions as described above for dielectric layers that cover an entire membrane surface. In particular, it may serve to enhance the sealing of a membrane surface to an adjacent membrane surface.

The aforementioned processes for patterning conductive layers may also be used to pattern dielectric layers onto the HPMs as used in this invention.

The adaptive membrane structures can consist of more than two HPMs, in which case it is required that a minimum of two of the HPMs do have conductive coatings, but it is not necessary for all of the HPMs to have conductive coatings.

The present invention is not limited to adaptive membrane structures comprising only two HPMs and their associated conductive and dielectric layers. For example, a structure may contain three HPMs with associated conducting layers, dielectric layers, and hole arrays, with an LPM interposed between at least one pair of HPMs. Two potential sources and two switches would allow three different actuation states to be achieved with such a system containing three HPMs. Such a design may be extended to include even more HPMs with an LPM interposed between at least one pair of HPMs. A variety of different structures may thus be designed that selectively impede the passage of different chemical, biological, or other particulate species by actuating different combinations of adjacent membrane closures. Such systems may include, in addition to two or more HPMs and one or more LPMS, one or more layers of fabric.

Although an applied electric field is a preferred form in which the actuating stimulus will operate, there are numerous other types of actuating stimuli that are useful for the purpose of causing the movement of membranes in the structure. Other possible actuating stimuli include without limitation a magnetic force, hydrostatic force, or hydrodynamic force, and two or more different kinds of actuating stimuli may be used on a membrane structure.

For example, certain polymers can absorb considerable amounts of water and other solvents, and can thereby swell to volumes that are significantly greater than the original dry volume. In so doing, the expansion and change of dimension of such a swellable polymer can transmit a hydrostatic force that would cause membrane movement.

Changes in temperature can also serve as another form of an actuating stimulus. Certain synthetic materials, naturally-occurring materials and engineered structures can generate significant forces as they change their dimensions in response to changes in temperature. Such a gain or loss of thermal energy may thus also be used to cause the movement of membranes herein, working through the material as its size is changed thereby.

In another embodiment, an electrostrictive material may be used to transmit a force derived electrically. An electrostrictive material, when subjected to electrical voltage, can undergo size deformation, with a consequent change in dimension, which can produce a force that will transmit the effect of the actuating electrical stimulus and move a membrane.

An embodiment based on the use of a magnetic force as the actuating stimulus can be configured by incorporating a spiral or helical winding of a conducting wire (e.g. copper wire) in the adaptive membrane structure so that the winding is adjacent to the membranes in the structure and oriented such that the axis of the winding is normal to the plane of the membranes. The winding is electrically connected in series with a switch and a source of electrical power such as a battery. A magnetic material is incorporated in one or more of the membranes in the structure, and the membranes are appropriately located within the structure such that their motion under action of the force of magnetic attraction will cause them to come in contact with each other or with one or more other adjacent membranes. The magnetic material could be incorporated within the bulk of a membrane or as a coating on a membrane surface. Possible magnetic materials include carbonyl iron particles dispersed within the bulk of a membrane or within a matrix comprising a coating on a membrane surface. Upon actuation of the system by closure of the switch, a magnetic field will develop in the vicinity of the winding, and this field will generate a force on the magnetic material incorporated in one or more membranes thereby causing the membrane(s) containing the magnetic materials to come in contact with one or more adjacent membranes.

The examples discussed above also illustrate a corresponding variety in the means that is provided to respond to the actuating stimulus, examples of which included above are a swellable polymer, a material that changes size in response to temperature change, an electrostrictive material and a magnetic material. Also suitable for use as means responsive to an actuating stimulus is a thermoelectric material, which can generate electrical energy when subjected to a change in temperature, and thus transmit to membranes the force a useful voltage that is representative of a gain in thermal energy.

The means responsive to the actuating stimulus are typically located in, on, within or adjacent to the adaptive membrane structure in close enough physical proximity to enable application of the force of the actuating stimulus to move at least one membrane. A conductor or magnetic particles may, for example, be printed on a membrane that has holes, may be printed on another membrane or layer that does not have holes, or may be formed itself as a separate membrane or layer. Further, a polymer or layer that changes shape and/or size may be located adjacent to a membrane that has holes, although other membranes or layers that do not have holes may be located there between provided that the mission of the polymer or material to apply a moving force to the membrane with holes is not hindered.

In view of the variety of forms in which the actuating stimulus may exist, as described above, another embodiment of this invention is an adaptive membrane structure that includes first and second movable membranes, and means to respond to an electrical, a magnetic, a hydrodynamic or a hydrostatic force. This also enables, in a membrane structure that includes first and second movable membranes, a method for moving the first membrane toward the second membrane by applying an electrical force, a magnetic, a hydrodynamic or a hydrostatic force to the first membrane.

Whatever form the actuating stimulus takes, it operates in one embodiment to a substantially uniform extent on all portions of at least one membrane. In particular in this embodiment, the actuating stimulus operates to a substantially uniform extent on the portion of a HPM proximal to each of the holes thereof, and thus in a regular pattern all across the surface of the membrane. The operation of the actuating stimulus is only substantially uniform because the membrane is pliable and will in many cases not form a perfect plane on which the applied force may operate equally on all infinitely small units of area across the surface of the plane. The intention in such case, however, is that the entire membrane move as a result of the application of the actuating stimulus.

In another embodiment, however, the actuating stimulus does not operate to a uniform extent on all portions of the membrane, and one or more portions of one HPM may be moved into contact with a corresponding portion or portions of another HPM in a position in which the holes of each portion of the first HPM are substantially out of registration, or are out of registration, with the holes of the corresponding portion of the second HPM. If there is more than one portion of the membrane where contact is made, the portions may, but need not, be selected in the form of regularly repeating geometric pattern. When the portions are distributed across the surface of the membrane in a regular pattern, it then becomes possible to regulate the permeability of the membrane structure by arranging for the actuating stimulus to be operative in only certain selected portions of the membrane at one time. It also becomes possible to rotate the application of the actuating stimulus, in a repeating sequence of actuation and deactuation, among the various portions on a programmed basis. This is most easily accomplished where an electrical force is the actuating stimulus, and circuity is provided that enables current to be supplied to or withdrawn from portions of the membrane with whatever spatial and timing arrangement is desired.

In particular, the adaptive membrane structure can be designed to display multiple states of gas, vapor and/or liquid permeability in addition to and different from those exhibited when the adaptive membrane structure is in the fully actuated, fully unactuated or fully deactuated state. In one embodiment, an adaptive membrane structure may be formed to have two or more portions or subsections, where each subsection of the structure is itself an adaptive membrane structure that displays some or all the features described herein. The permeability of the structure as a whole may be altered by changing the permeability of some or all of the subsections of the structure, and by doing so at different times. An actuating stimulus can be applied to each subsection of the membrane structure independently of all the other subsections. Hence, several different states of permeability may be obtained for the structure as a whole by moving membranes in some of the subsections, while not moving membranes in other of the subsections, that together make up the adaptive membrane structure as a whole. In another embodiment, however, all membranes in all subsections may be moved at the same time.

Figure 8:
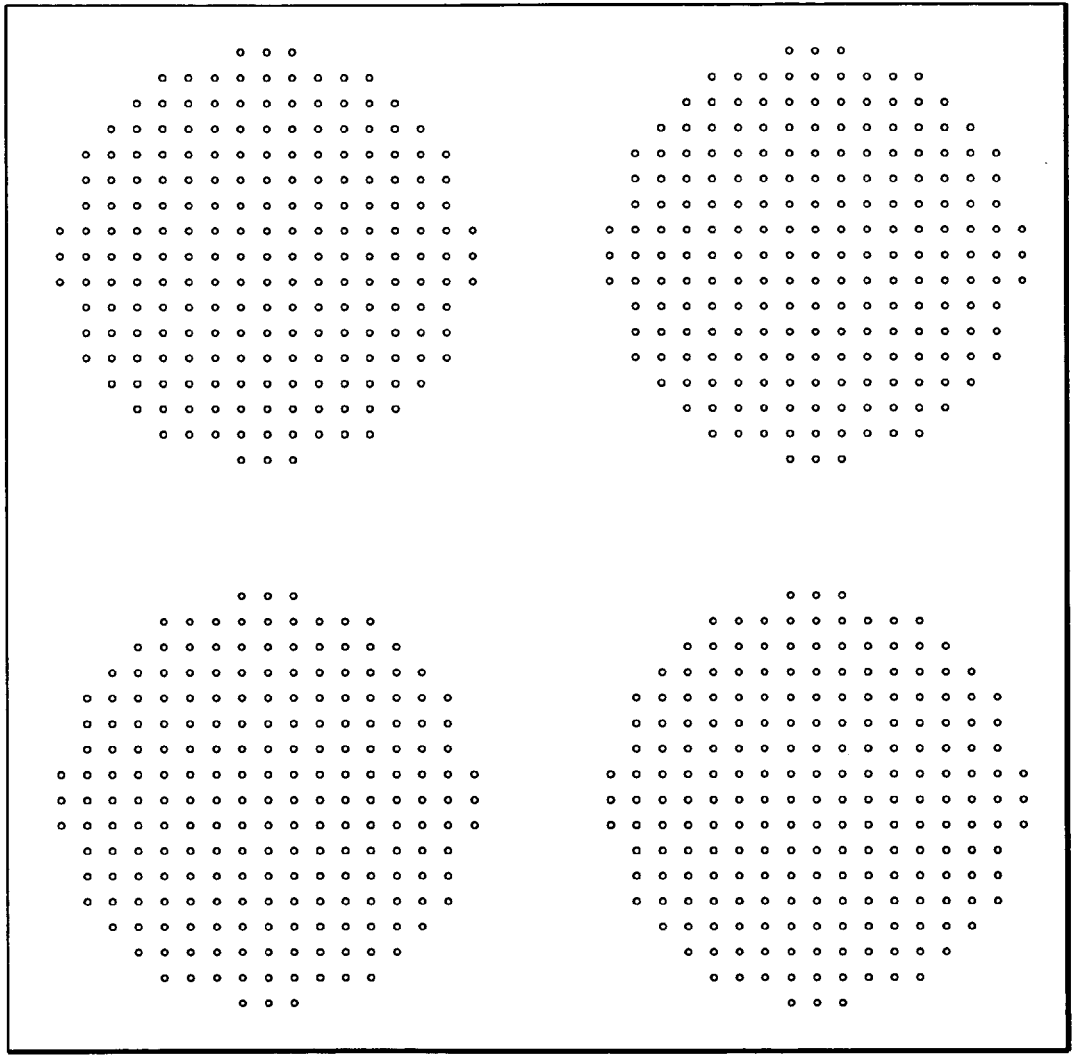
FIG. 8 shows a plan view of an adaptive membrane structure that has four subsections and each subsection has an array of holes.

One example of an adaptive membrane structure that has several such subsections is illustrated in FIG. 8. The figure shows a plan view of a HPM that has four subsections, and each subsection consists of an array of holes. Two or more HPMs such as the membrane illustrated in FIG. 8 can be provided in the structure such that the array of holes in each subsection of one HPM are substantially out of registration, or are out of registration, with the array of holes of the corresponding HPM subsection on another adjacent membrane. A separate actuating stimulus, and means responsive thereto, can be provided for each subsection of a membrane. For example, in an embodiment where the actuating stimulus is an applied electrical field, each of the four subsections may have its own conductive features that may or may not be connected to the conductive features of the other subsections in the membrane. By assembling the membrane illustrated in FIG. 8 with at least one and possibly more corresponding membranes, and by connecting the resulting adaptive membrane structure to an appropriate electrical circuit, it is possible to apply an actuating stimulus to any one, any two, any three or all four of the subsections of the membrane structure. In so doing, they will be able to demonstrate at least 5 different states of permeability for such an adaptive membrane structure with four subsections.

The membrane of FIG. 8 is shown having four similar subsections. However, the individual membranes in a structure need not have exactly the same subsections. An adaptive membrane structure may be assembled such that the individual subsections of one membrane are completely different from other subsections on the same membrane as long as the corresponding subsections on adjacent membranes have arrays of holes that are substantially out of registration, or are out of registration, with each other.

A HPM with multiple subsections may be formed by creating an array of holes for each subsection on a single continuous sheet of material. A membrane comprising several subsections may also be formed by first creating individual subsection membranes and then joining the subsections to create a larger sheet or layer. The subsections may be joined to each other using reactive or non reactive adhesives or using different welding techniques such as radio frequency welding, ultrasonic welding and vibration welding.

Figure 9A:
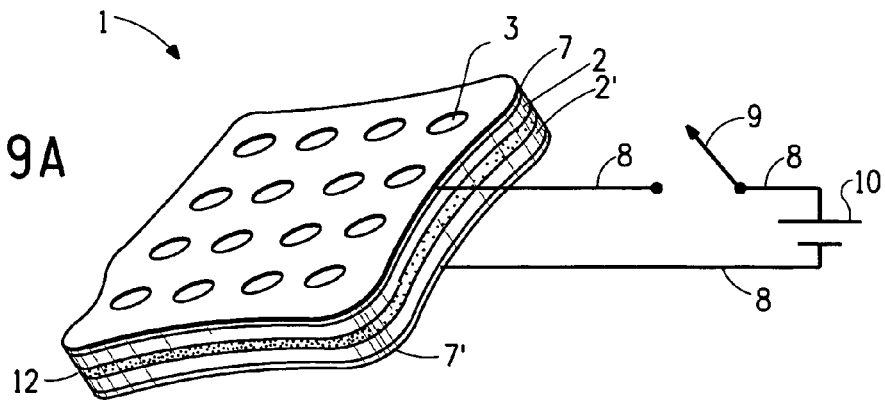
FIG. 9 is a schematic diagram of an unactuated adaptive membrane structure that includes a spacer material as a deactuation means. (9A: perspective view. 9B: plan view. 9C: sectional view.)
Figure 9B:
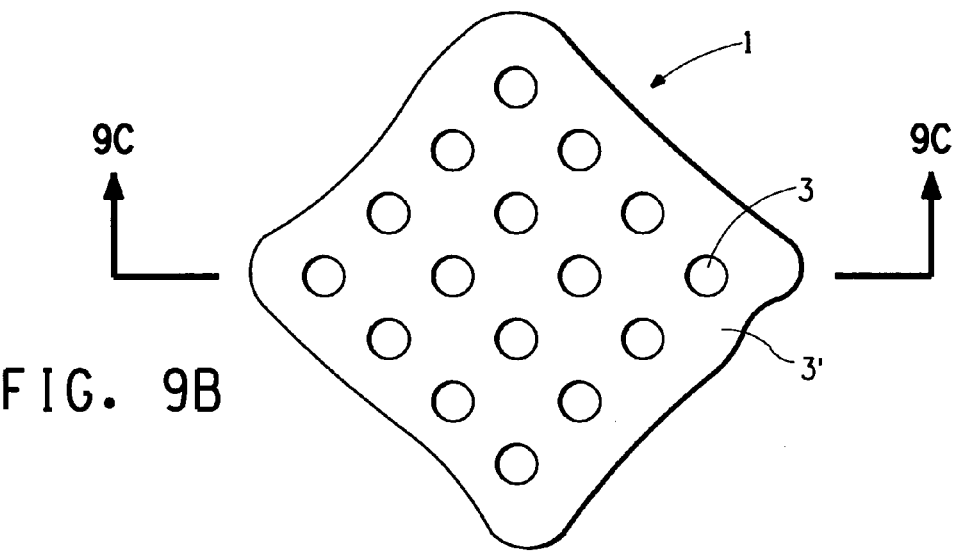
Figure 9C:
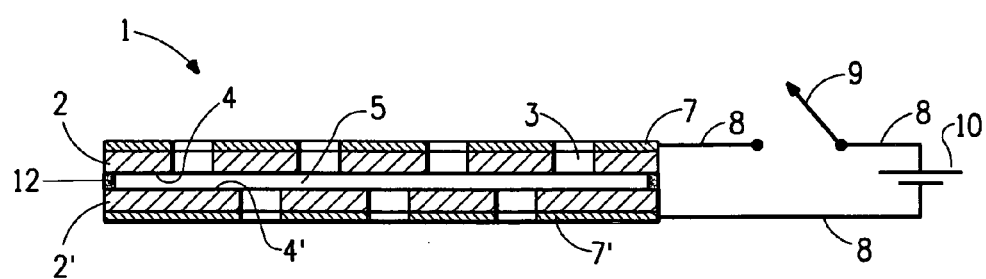
Figure 10A:
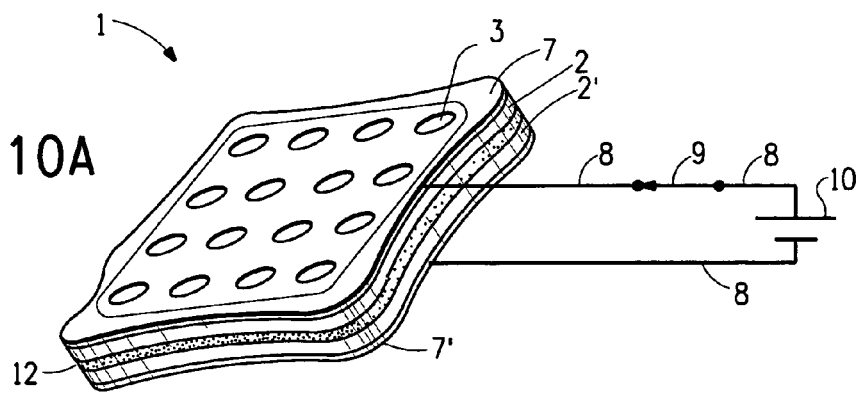
FIG. 10 is a schematic diagram of an actuated adaptive membrane structure that includes a spacer material as a deactuation means. (10A: perspective view. 10B: plan view. 10C: sectional view.)
Figure 10B:
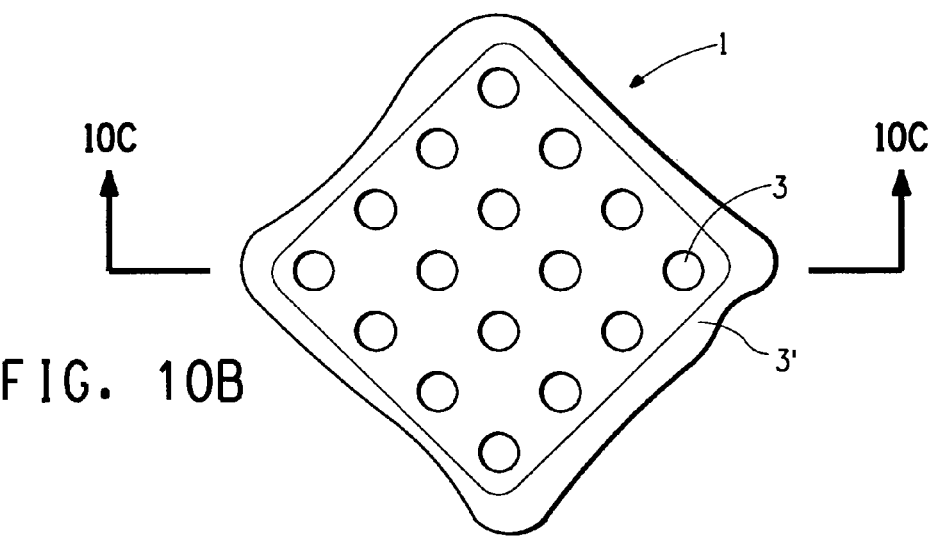
Figure 10C:
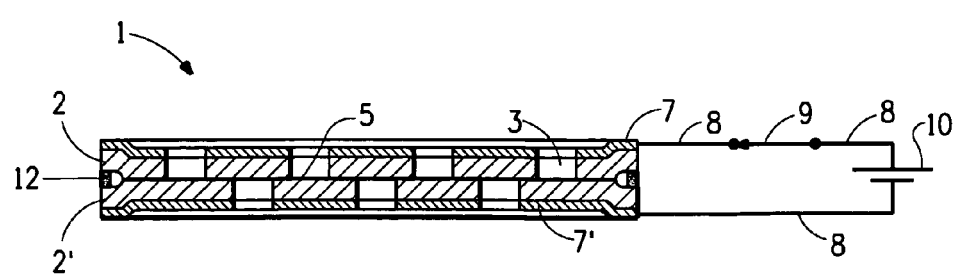

A further feature of the invention is a means of keeping adjacent membranes spaced apart during any time when the actuating stimulus is not applied or operating to move the membranes into contact with each other. This will produce a gap between the adjacent surfaces of the membranes to enable permeation through the structure as described above. In FIGS. 9A and 9C, a gap 5 between adjacent surfaces 4 and 4' is shown, and a spacer material 12 is installed between the adjacent membrane surfaces 4 and 4', the spacer material being of a shape that it does not block the openings to any holes of either membrane surface and has a thickness that results in the formation of the gap between the adjacent membrane surfaces. Upon application or operation of the actuating stimulus, one or both of the adjacent membranes undergo elastic deformation as depicted in FIGS. 10A, 10B and 10C such that the adjacent surfaces are brought together to provide contact between the adjacent surfaces and seal the holes thereof, in the manner described above (compare items 7 and 7' in FIGS. 9C and 10C). In this context, moreover, the actuating stimulus and the means responsive to the actuating stimulus may be viewed together as means for deforming a membrane to move it into contact with another membrane when a spacer is present between the two membranes. Upon release of the actuating stimulus, however, the elastic energy stored in the deformed membranes is recovered, and the membranes return to their initial position as shown in FIGS. 9A, 9B and 9C whereby the gap 5 between the adjacent membrane surfaces is restored. This ability to facilitate reformation of the gap 5 after removal of the actuating stimulus is a further characteristic of the membrane structure, and is termed the "deactuating means". Although the presence of a third membrane interposed between membranes 2 and 2' is not shown in FIGS. 13 and 14, spacers could be positioned between membrane 2 and the third membrane, and between membrane 2' and the third membrane in the same manner as described above. The presence of the spacers together with the third membrane would not interfere with the ability of membranes 2 and 2' to undergo elastic deformation in the manner needed to make contact, respectively, with the two sides of the third membrane.

The adaptive membrane structures can be used as components of a variety of articles of manufacture, including without limitation articles of apparel, enclosures, sensor devices, and valves for controlling the flow of gas, vapor, liquid and/or particulates.

The adaptive membrane structures can be used as components of articles of apparel, especially for clothing intended to protect against chemical and biological toxins and pathogens. Such articles include without limitation those selected from the group consisting of protective suits, protective coverings, hats, hoods, masks, gowns, coats, jackets, shirts, trousers, pants, gloves, boots, shoes, shoe or boot covers, and socks.

The adaptive membrane structure can also be used in consumer apparel to protect against the natural elements. In one embodiment, the structure can be used as an inner liner in responsive outerwear apparel used for recreational and other outdoor activities, such that the liner could be made to change its permeability depending upon external temperature and wind conditions, so as to increase the comfort of the wearer. Examples of such outerwear include without limitation coats, jackets, ski pants, gloves, hats, hoods and masks. In another embodiment, a membrane structure can be used as a responsive liner in raingear. In dry external conditions, the liner would be highly permeable, thus breathable, but in wet and rainy conditions, the liner would be made impermeable to external precipitation.

The adaptive membrane can be used for various medical applications. In one embodiment, the structure can be used to fabricate items of apparel for health care workers, including without limitation surgical masks, medical or surgical garments, gowns, gloves, slippers, shoe or boot covers, and head coverings.

For some of the aforementioned applications, the adaptive membrane structures may be used in the absence of any additional porous material layers, while for some other applications a multi-layered system may be created where the adaptive membrane structure forms only one component in the multi-layered system. Examples of porous layers that could be used in conjunction with the adaptive membrane structure are woven fabrics, non-woven films and porous membranes. Additional porous layers may be used with the objective of (i) creating a composite system that protects the adaptive membrane structure from an environment that may degrade its performance, and (ii) creating a composite system that has more features than those that can be offered by the adaptive membrane structure itself.

For example, for the purpose of creating fire retardant apparel that also protects a firefighter from noxious fumes and vapors, the adaptive membrane structure can be layered with or sandwiched between fire retardant fabrics. In this case, the outer fire retardant fabric protects the wearer and the adaptive membrane structure from the fire. For the purpose of creating commercial apparel that protects against the natural elements, the membrane structure can be sandwiched between woven fabrics. The outer and the inner fabric may be chosen to impart a comfortable feel as well as to provide a fashionable appearance to the apparel. Colored and patterned fabrics may also be used as outer layers to introduce additional camouflage feature to chemical and biological protective apparel for the soldier. In some cases, microporous membranes may be used to protect the adaptive membrane structure from dust and liquids.

An adaptive membrane structure as disclosed herein can be incorporated into an article of apparel by any of the knitting, sewing, stitching, stapling or adhering operations known in the art. It is common in the art to use fabrics or other materials having multiple layers from which to make apparel, and the adaptive membrane structure can be incorporated therein by conventional methods.

The potential uses of the adaptive membrane structure are numerous and are not limited to protective apparel for humans. In other embodiments, the adaptive membrane structure can be used to create or construct an enclosure for the occupancy of humans, animals or perishables. The term "perishables" as used herein includes not just edible materials but any material that is sensitive to, or may be damaged or degraded by exposure to, the environment. Such enclosure would include for example collective shelters, such as tents, that protect groups of individuals against chemical and biological warfare agents. In another embodiment, the invention could be used to set up safe rooms in commercial and residential buildings. For example, the safe rooms assembled using the adaptive membrane structure would be permeable under non-threatening conditions but would become impermeable when toxic agents are released in the external environment. In another embodiment, a tarpaulin comprising the adaptive membrane structure can be used to protect stored equipment.

The adaptive membranes can also be used to create an external water barrier layer in the construction of commercial and residential buildings such as dwellings and office buildings. The vapor barrier, or vapor-retardant layer, in a building should be impermeable enough to prevent precipitation from outside of the building to permeate inside, but yet should be breathable enough to allow excess moisture in the walls to permeate to the outside. Therefore, in one embodiment, the adaptive membrane can be used as a responsive vapor barrier in commercial and residential buildings such that the barrier layer can exist in multiple states. When there exists excess moisture in the building walls, the barrier layer would be made vapor permeable, and when there is high humidity in the external environment, the barrier layer would be made impermeable.

Adaptive membranes disclosed herein, when constructed from transparent polymer films, could also be used to construct agricultural and horticultural greenhouses. Temperature control in a greenhouse is an important issue for optimum plant growth. Existing greenhouses are constructed from polymer films of low gas and vapor permeability. Since such polymer films are not breathable, the temperature in a greenhouse is conventionally controlled by the opening and closing of engineered vents. This often leads to undesirable temperature gradients in the greenhouse. If an adaptive membrane structure is used to construct the greenhouse, the internal temperature could be more evenly controlled by changing the permeability of the membrane that envelops the greenhouse. As the temperature in the greenhouse rises, the membrane could be made more permeable, thereby allowing the process of free convection to reduce the temperature in the greenhouse. Similarly, as the temperature in the greenhouse falls, the membrane could be made less permeable, allowing the temperature in the greenhouse to rise.

In yet another embodiment, an adaptive membrane structure could be used in temporary, soft-walled construction, or in permanent construction, to create a clean room in which to perform surgical procedures, or in which to conduct activities requiring high air purity such as computer chip fabrication.

The adaptive membrane can also be used for managing the environment in small and large storage areas and containers such as those used for storing perishables. The term "perishables" as used herein includes not just edible materials but any material that is sensitive to, or may be damaged or degraded by exposure to, the environment. For example, edible materials such as fresh fruits and vegetables may need to be stored under optimum humidity levels to maintain freshness and enhance their shelf life. Adaptive membrane structures disclosed herein could be used to create storage areas or storage containers that respond to the local environment conditions. For example, when the local water vapor concentration in the stored area is above the desired level, the adaptive membranes will deactuate to release excess water vapor to the surrounding environment, and will actuate once the water vapor drops below the desired level. Such responsive storage devices could be used to ship edible materials or other perishables from one place to another or to store them in commercial and residential settings such as cold storage areas and refrigerators.

Adaptive membrane structures disclosed herein can also be used to enhance the life and performance of a sensor device, and in this sense a sensor device may be viewed as a perishable. The active components in a sensor device are very sensitive to their environment and can be poisoned by liquid or vapor or particulate species in the environment. Such devices can also be corrupted when exposed to high concentrations of the species they are designed to sense. In one embodiment, an adaptive membrane structure, by its ability to have different states of permeability in the actuated and the deactuated states, can be used to control the flow of species to an enclosure housing the active component of a sensor. In another embodiment, an adaptive membrane structure can be used as a protective layer or a shroud around the active component. For this application, when it is desired that the sensor be in the active state for sensing, the adaptive membrane structure may be left in the unactuated state allowing the active component of the sensor to come in contact with species in the environment that need to be sensed. But when the sensor is no longer in the active or sensing state, the adaptive membrane structure can be deactuated to the closed state thereby protecting the active component of the sensor and enhancing its life.

An adaptive membrane structure can also be used as a valve to control the rate of release of a vapor, aerosol or liquid, such as those used as fragrance compounds, perfumes, room fresheners, insecticides, pesticides or pharmaceuticals. In one embodiment, a controlled release device would include an adaptive membrane structure, which would separate the agent to be released from the surrounding environment. When the structure is in the deactuated state, the agent would be released to the environment by means of diffusion and or convection. However, when the structure is in the actuated state, transport of the agent to the environment would be reduced or stopped. The rate of release of the agent would be controllable by adjusting the frequency with which the structure in the controlled release device is oscillated between the actuated state and the deactuated state.

The use of an adaptive membrane structure in connection with physical assets or devices such as enclosures, buildings, sensors and valves can be achieved by fabrication and construction methods known in the art. The adaptive membrane structure may be interleaved between other layers or structural elements such as when a building wrap is installed between the interior and exterior portions of a wall. Or when the adaptive membrane structure is used in an essentially free-standing application such as in a tent, greenhouse, valve or protective cover for a sensor, installation may be achieved by anchoring it to a suitable frame.

The use of the adaptive membrane structures disclosed herein for valve purposes enables a method for controlling the flow of gas, vapor, liquid and/or particulates through the adaptive membrane structure by (a) providing the holes in two HPMs in a position in which the holes are substantially out of registration, or are out of registration, and (b) moving the HPMs into contact with a LPM.

EXAMPLES

The present invention is further defined in the following examples. It should be understood that these examples, while indicating preferred embodiments of the invention, are given by way of illustration only. From the above discussion and these examples, the artisan will be able to ascertain the essential characteristics of this invention, and, without departing from the spirit and scope thereof, will be able to make various changes and modifications of the invention to adapt it to various uses and conditions.

Example 1

In the adaptive membrane structure of FIG. 1, HPMs 2 and 2' each contain holes 0.05" (1.3 mm) in diameter spaced 0.1" (2.5 mm) apart in a square array, and LPM 21, having a thickness 0.002" (0.05 mm) is interposed therebetween. According to the equations given above, the mass flux of an agent in the actuated state can be estimated to be only 0.02% of the mass flux in the unactuated state.

Where an apparatus or method of this invention is stated or described as comprising, including, containing, having, being composed of or being constituted by certain components or steps, it is to be understood, unless the statement or description explicitly provides to the contrary, that one or more components or steps other than those explicitly stated or described may be present in the apparatus or method. In an alternative embodiment, however, the apparatus or method of this invention may be stated or described as consisting essentially of certain components or steps, in which embodiment components or steps that would materially alter the principle of operation or the distinguishing characteristics of the apparatus or method would not be present therein. In a further alternative embodiment, the apparatus or method of this invention may be stated or described as consisting of certain components or steps, in which embodiment components or steps other than those as stated or described would not be present therein.

Where the indefinite article "a" or "an" is used with respect to a statement or description of the presence of a component in an apparatus, or a step in a method, of this invention, it is to be understood, unless the statement or description explicitly provides to the contrary, that the use of such indefinite article does not limit the presence of the component in the apparatus, or of the step in the method, to one in number.

What is claimed is:

1. An adaptive membrane structure comprising first and second membranes wherein each of the first and second membranes has holes, a third membrane substantially free of holes interposed between the first and second membranes, and means to respond to an actuating stimulus that moves the first and second membranes into contact with the third membrane; wherein the permeability of the first and second membranes to gas, vapor, liquid and/or particulates is greater than that of the third membrane.

2. The structure of claim 1 wherein the holes of the first membrane are substantially out of registration, or are out of registration, with the holes of the second membrane.

3. The structure of claim 1 wherein one or both of said first and second membranes have an electrically conductive coating on a surface thereof, wherein the conductive coating is optionally applied in a pattern that covers selected areas of a membrane's surface and wherein the conductive coating is itself optionally coated with one or more layers of dielectric material.

4. The structure of claim 1 wherein each of the first and second membrane has holes, and the structure further comprises one or more spacers between the membranes wherein no spacer blocks a hole.

5. The structure of claim 1 further comprising a sensor that detects a change in the temperature, humidity, or concentration of a selected chemical, biological or particulate species in the environment in which the structure is located.

6. The structure of claim 1 wherein the sensor activates the actuating stimulus.

7. The structure of claim 1, which is impermeable to a selected human pathogen or toxin in its actuated state.

8. The structure of claim 1, which is permeable to water, vapor in its actuated state.

9. The structure of claim 1 wherein at least one membrane comprises at least one polymer.

10. The structure of claim 1 wherein at least one membrane comprises at least one member selected from the group consisting of activated carbon, high surface silica, molecular sieves, xerogels, ion exchange materials, powdered metal oxides, powdered metal hydroxides, and antimicrobial agents.

11. An article of manufacture comprising the adaptive membrane structure of claim 1.

12. The article of manufacture of claim 11 which is selected from the group consisting of apparel, enclosures, sensor devices, and valves for controlling the flow of gas, vapor, liquid and/or particulates.

13. The article of claim 12 which is selected from the group consisting of protective suits, protective coverings, hats, hoods, masks, gowns, coats, jackets, shirts, trousers, pants, gloves, boots, shoes socks, raingear, medical and surgical garments, tents, tarpaulins, safe rooms, clean rooms, greenhouses, dwellings, office buildings, storage containers and controlled release devices.

14. The adaptive membrane structure of claim 1 which comprises a low permeability membrane interposed between two high permeability membrane wherein $$k_{LPM}/t_{LPM} \leqq 10 k_{HPM1}/t_{HPM1}$$

and $$k_{LPM}/t_{LPM} \leqq 10 k_{HPM2}/t_{HPM2}$$

wherein
- $k_{LPM}$ is the permeability of the material from which the third membrane is made,
- $k_{HPM1}$ is the permeability of the material from which the first membrane is made,
- $k_{HPM2}$ is the permeability of the material from which the second membrane is made,
- $t_{LPM}$ is the thickness of the third membrane,
- $t_{HPM1}$ is the thickness of the first membrane, and
- $t_{HPM2}$ is the thickness of the second membrane.

* * * * *